(12) United States Patent
Wang et al.

(10) Patent No.: US 8,270,288 B2
(45) Date of Patent: Sep. 18, 2012

(54) METHOD OF PARALLEL WIRELESS COMMUNICATION

(75) Inventors: Qixin Wang, Sunnyvale, CA (US); Serbulent Tozlu, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 785 days.

(21) Appl. No.: 12/199,282

(22) Filed: Aug. 27, 2008

(65) Prior Publication Data
US 2010/0054178 A1 Mar. 4, 2010

(51) Int. Cl.
*H04L 12/26* (2006.01)
(52) U.S. Cl. ...................................................... 370/216
(58) Field of Classification Search .................. 370/216, 370/412, 218, 229–236, 310, 312
See application file for complete search history.

(56) References Cited

U.S. PATENT DOCUMENTS

| | | | |
|---|---|---|---|
| 5,371,734 A | 12/1994 | Fischer | |
| 5,793,963 A | 8/1998 | Tapperson et al. | |
| 6,658,850 B1 | 12/2003 | House et al. | |
| 7,065,376 B2 | 6/2006 | Wolman et al. | |
| 7,158,528 B2 * | 1/2007 | Dell et al. | 370/416 |
| 7,545,780 B2 * | 6/2009 | Chitrapu | 370/338 |
| 7,899,453 B2 * | 3/2011 | Zhang et al. | 455/432.1 |
| 2004/0137901 A1 * | 7/2004 | Hamasaki et al. | 455/436 |
| 2006/0077917 A1 | 4/2006 | Brahmajosyula et al. | |
| 2007/0147535 A1 * | 6/2007 | Niu et al. | 375/267 |
| 2008/0043745 A1 * | 2/2008 | Toomey et al. | 370/395.21 |
| 2008/0256272 A1 * | 10/2008 | Kampmann et al. | 710/57 |

FOREIGN PATENT DOCUMENTS

EP 1107079 A2 11/1999

* cited by examiner

*Primary Examiner* — Gary Mui
(74) *Attorney, Agent, or Firm* — Taft Stettinius & Hollister LLP; Keith Swedo

(57) ABSTRACT

A data communication method includes providing a sender node having a data packet of information. The data packet is sent to each of a plurality of heterogeneous transmitter devices. The data packet is wirelessly transmitted from each of the transmitter devices to a receiver node.

17 Claims, 8 Drawing Sheets

METHOD OF PARALLEL WIRELESS COMMUNICATION

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright ©2008, Robert Bosch GmbH, All Rights Reserved.

BACKGROUND OF THE INVENTION

1. Field of the Invention

The present invention relates to a method for wireless communication, and, more particularly, to a method for wireless communication for real-time industrial/medical control.

2. Description of the Related Art

Wireless real-time applications, such as for industrial/medical control, include many desirable features, such as enhanced mobility, lower installation cost, better flexibility, and reduced risk of tripping over wires. On the other hand, these applications may require real-time delivery of messages. That is, messages may need to arrive before deadlines, even under adverse wireless channel conditions, such as severe large-scale path loss, multipath, and accidental interference from same-band or adjacent-band radio devices. Industrial/medical environments make the wireless medium more hostile to wireless communications due to heavy blockage and various Electro-Magnetic Interference (EMI) sources. Therefore, robustness and reliability is a top concern for wireless real-time applications.

What is neither disclosed nor suggested by the prior art is a method of wireless communication having improved robustness and reliability.

SUMMARY OF THE INVENTION

The present invention provides a lightweight open architecture to deploy heterogeneous wireless devices operating in parallel. The architecture uses redundant wireless devices for robust and reliable real-time industrial/medical control. By exploiting the redundancy, the present invention increases the chance of packets being correctly delivered within deadlines. The open architecture of the present invention provides improved real-time support, as most industrial/medical control applications are real-time.

The architecture of the present invention may eliminate synchronization issues of diverse applications and various wireless devices having different transmission speeds. The architecture of the present invention may also enable the most up-to-date state information of control/sensing to be sent.

The present invention may be particularly applicable in factories and industrial process automation as well as in the medical domain, such as in operation rooms and intensive care units.

Synchronizing heterogeneous wireless devices for parallel packet transmission is difficult, as different devices have different data rates. However, the lightweight open architecture of the present invention may eliminate the need for synchronization while still satisfying the needs of most real-time industrial/medical control applications.

The invention comprises, in one form thereof, a wireless communication method including providing a sender node having a data packet of information. The data packet is sent to each of a plurality of heterogeneous transmitter devices. The data packet is wirelessly transmitted from each of the transmitter devices to a receiver node.

The invention comprises, in another form thereof, a communication method including providing a sender node. A plurality of data packets of information is provided. Each of the data packets has a different level of priority. A plurality of heterogeneous transmitter devices is provided. The data packets are sent from the sender node to the transmitter devices. Each of the data packets is sent to a different subset of the transmitter devices based on the level of priority of the data packet. The data packets are wirelessly transmitted from the transmitter devices to a receiver node.

The invention comprises, in yet another form thereof, a communication method including providing a sender node. A plurality of data packets of information is provided. Each of the data packets has a different level of priority. A plurality of heterogeneous transmitter devices is provided with different data rates. The data packets are sent from the sender node to the transmitter devices. Each of the data packets is sent to a different subset of the transmitter devices based on the level of priority of the data packet. A highest priority one of the data packets is sent to each of the transmitter devices. A lowest priority one of the data packets is sent to a lowest priority subset of the transmitter devices. The transmitter devices in the lowest priority subset have the highest data rates. The data packets are wirelessly transmitted from the transmitter devices to a receiver node.

An advantage of the present invention is that it provides increased levels of robustness and reliability.

Another advantage of the present invention is that it may eliminate synchronization issues of diverse applications and various wireless devices having different transmission speeds.

Yet another advantage of the present invention is that it may enable the most up-to-date state information of control/sensing to be sent.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
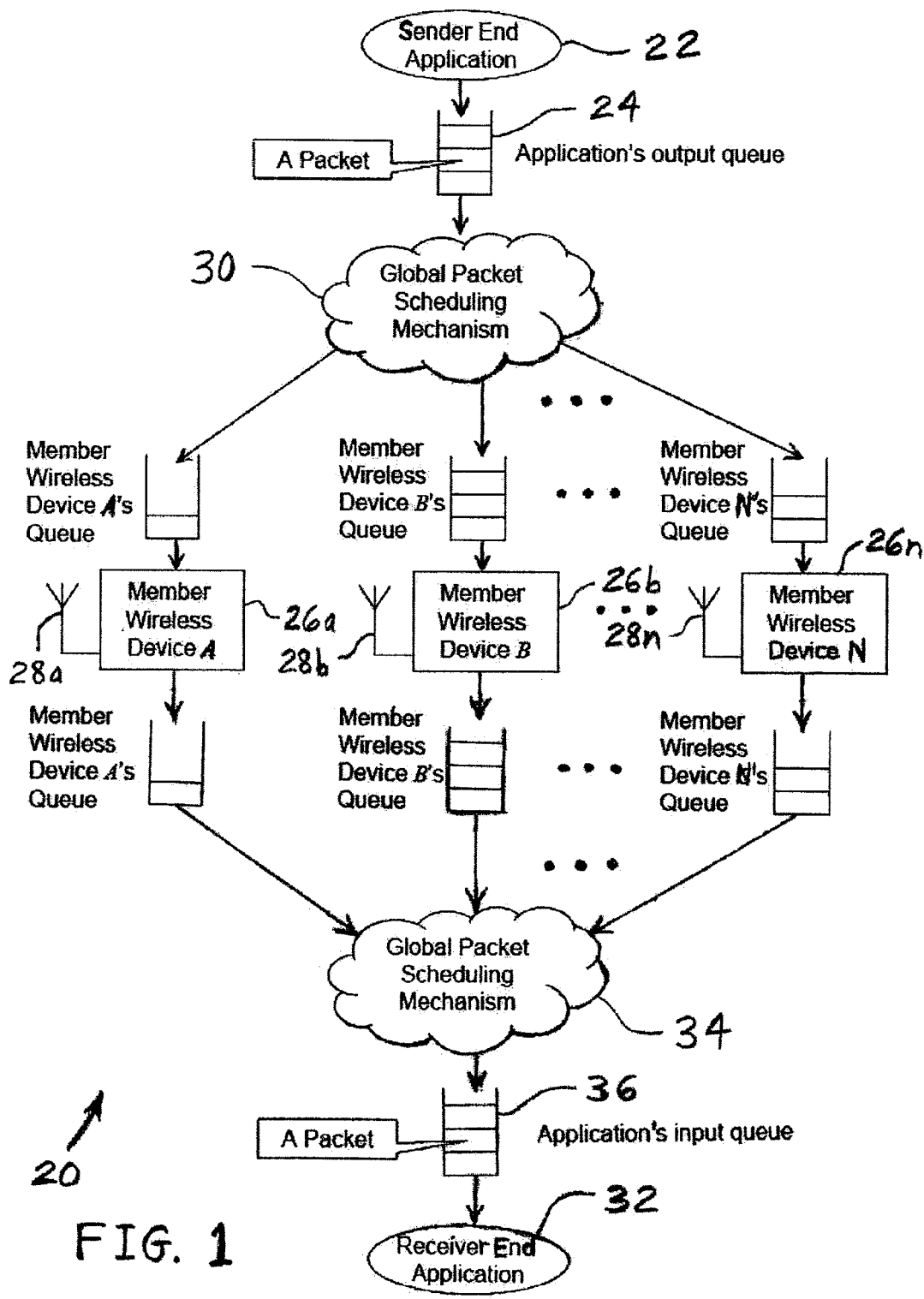
FIG. 1 is a block diagram of one embodiment of a wireless system suitable for use with the wireless communication method of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The present invention may be described herein in terms of algorithms and operations on data bits within a computer. It has proven convenient, primarily for reasons of common usage among those skilled in the art, to describe the invention in terms of algorithms and operations on data bits. It is to be understood, however, that these and similar terms are to be associated with appropriate physical elements, and are merely convenient labels applied to these physical elements. Unless otherwise stated herein, or apparent from the description, terms such as "providing", "assigning", "using", "converting", "transmitting", "calculating", "determining", "processing", "selecting", "sending", "receiving", "predicting", "confirming" or "computing", or similar terms, refer the actions of a computing device that may perform these actions automatically, i.e., without human intervention, after being programmed to do so.

Many wireless communication schemes exist, such as ZigBee, IEEE 8002.11 WLAN (WiFi), DS-CDMA, and Ultra-Wide Band (UWB). Each scheme has its respective merits and weaknesses. To achieve better robustness and reliability, the present invention provides an open architecture to run multiple wireless schemes in parallel. The wireless devices may be Commercial Off-The-Shelf (COTS) or proprietary, and may be heterogeneous in that the wireless devices can vary in radio spectrum, modulation scheme, network protocol, data rate, etc. The open architecture of the present invention merges this hybrid of wireless schemes and exploits the device redundancy and wireless medium heterogeneity so as to enhance robustness and reliability. For example, to deliver a 1000 bit packet to a wireless receiver within a real-time deadline of 25 msec, the packet may be sent out from a 40 kbps ZigBee card at 900 MHz radio band, from a 1 Mbps WiFi card at 2.4 GHz radio band, and from a 1.2 Mbps Ultra-Wide Band card at 4 GHz radio band, all at the same time (i.e., in parallel). In this way, the packet can reach the receiver within its 25 msec deadline even if one or two wireless channels totally fail. For example, if both the 900 MHz ZigBee channel and the 2.4 GHz WiFi channel fail, the packet can still reach the receiver through the Ultra-Wide Band card at 4 GHz radio band.

By communicating real-time jobs through different radio frequency media in parallel, the open architecture of the present invention may integrate heterogeneous wireless devices to enhance wireless communication robustness and reliability of real-time industrial/medical control applications.

When devices are described herein as being "heterogeneous," it is meant that the devices have different operating characteristics that may make the devices subject to, or resilient to, different types of communication failure. For example, the heterogeneous devices may operate in different frequency bands, making the devices susceptible to interference from external radio frequency sources of different frequency bands.

A benefit of the architecture of the invention is the elimination of synchronization issues of both diverse applications and various wireless devices with different transmission speeds. Another benefit is being able to transmit the most up-to-date state information for control and sensing.

Referring now to the drawings and particularly to FIG. 1, there is shown one embodiment of a wireless network 20 suitable for use in conjunction with the wireless communication method of the present invention. FIG. 1 illustrates the packet sending and receiving schemes of the open architecture.

In order to send a packet, a sender node in the form of a sender end application 22 may put the packet into an output queue 24 shared by all parallel and heterogeneous member wireless devices 26*a*, 26*b* . . . , 26*n*, of the open architecture. Each of wireless devices 26*a*, 26*b*, . . . , 26*n* may have a respective antenna 28*a*, 28*b*, . . . , 28*n* for reception and transmission of data packets.

A processor-based global packet scheduling mechanism 30 may decide which one(s) of member wireless device(s) 26*a-n* is to be sent which packet (or a duplicate of the packet). Global packet scheduling mechanism 30 may attempt to send each packet to a receiver node in the form of a receiver end application 32 by using as many of member wireless devices 26*a-n* in parallel as possible. A difficulty to be overcome, however, is that member wireless devices 26*a-n* may have drastically different data rates, and these data rates may not be multiples of each other.

In one simple embodiment, packets are sent according to the lowest data rate of member wireless devices 26*a-n*, although application performance may be compromised thereby. For example, a ZigBee device's data rate is only 40 kbps, while a WiFi device's data rate is at least 1 Mbps. Assume an industrial control application's control packet size is 1000 bits. Using the "lowest data rate" strategy, only 40 packets are sent every second, although the WiFi device is able to send 1000 packets per second. Not fully utilizing the WiFi's 1000 packet/second capability (when the WiFi wireless channel condition is good) can result in less than optimal control performance.

In another embodiment, packets are prioritized. The most critical (i.e., the highest priority) packets may be sent by all member wireless devices 26*a-n*; the less critical packets are sent by only ones (i.e., a first subset) of member wireless devices 26*a-n* that have higher data rates; and the least critical packets are sent by only ones of member wireless devices 26*a-n* that have the highest data rates (i.e., a subset of the first subset).

In this nontrivial embodiment, a few problems that may need to be addressed include: How many priorities shall there be? Which packet shall have which priority? What is the subset of member wireless devices 26*a-n* for each priority? How should the utilization of the member wireless devices 26*a-n* be improved? What shall a member wireless device 26*a-n* do if it fails to transmit high priority packets?

Global packet scheduling mechanism 30 may work out a plan to synchronize the behaviors of all member wireless devices 26*a-n*, which may operate at drastically different data rates. The present invention may advantageously provide a lightweight solution, i.e., a solution that does not require a lot of processing power, to this synchronization problem.

For most real-time industrial/medical control applications, the purpose of real-time communication may be to deliver the most up-to-date state of the machine/patient, or the most up-to-date control command. For these applications, the aforementioned synchronization problem can be greatly simplified: once the application generates a new packet to send, the old packet becomes obsolete, and no longer needs to be sent.

Figure 2:
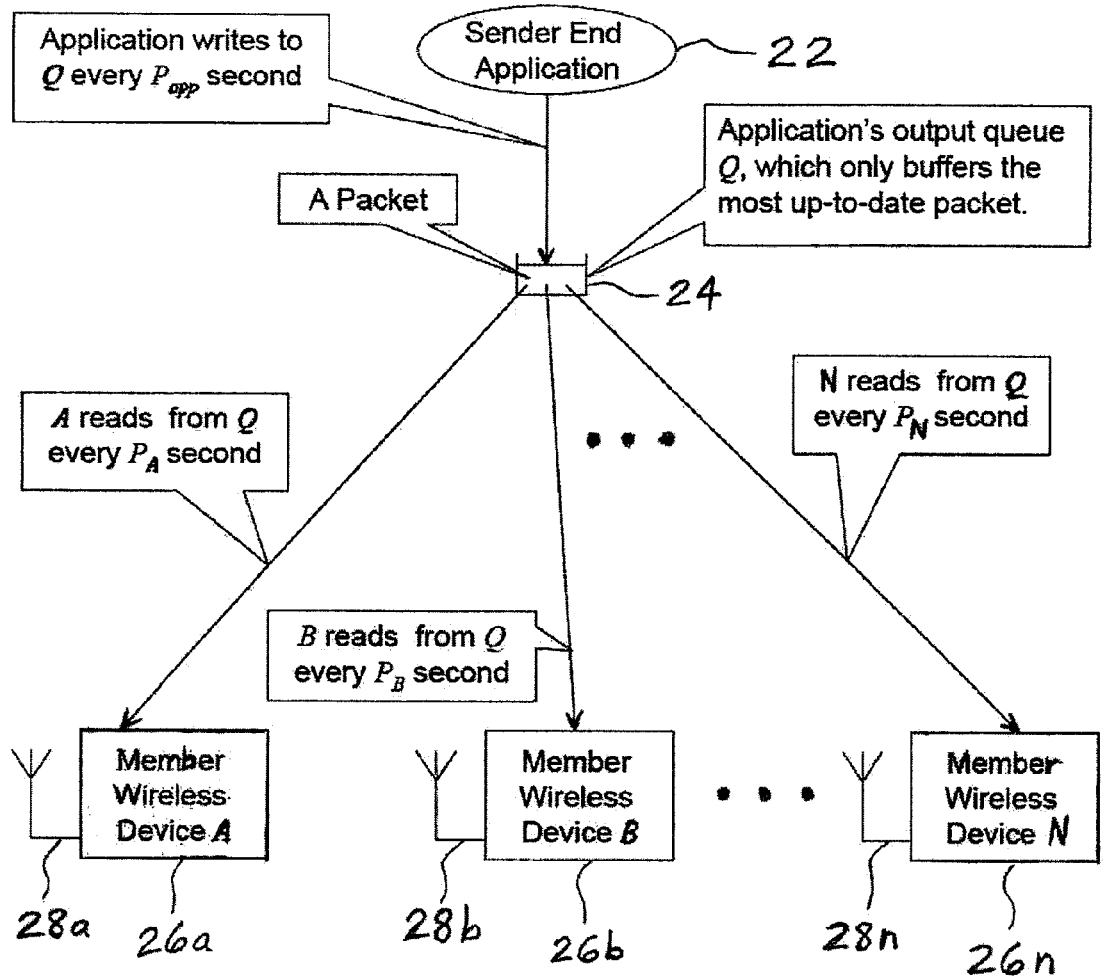
FIG. 2 is a block diagram of another embodiment of a sender end of a wireless system suitable for use with the wireless communication method of the present invention.

Based on the above observations, the present invention provides a lightweight solution as shown in FIG. 2. In one embodiment, the sender end application's output queue 24 holds only the most up-to-date packet. Every newly-generated packet overwrites the existing packet in the sender end application's output queue 24.

Each member wireless device 26a-n may independently read the sender end application's output queue 24 according to the device's own data rate, and may send the sampled packet to receiver end application 32 according to the member wireless device's own data rate. For example, assume the packet size is 1000 bits, then a 40 kbps ZigBee device may read the sender end application's output queue every 25 msec (1000 bits/40 kbps=25 msec), a 1 Mbps WiFi device may read the sender end application's output queue every 1 msec (1000 bits/1 Mbps=1 msec), etc.

Because only the most up-to-date packet is important, a member wireless device 26a-n may not retransmit a same packet. Instead, the device may send the next packet read from the sender end application's output queue 24 regardless of whether the previous packet was successfully sent or not.

Figure 3:
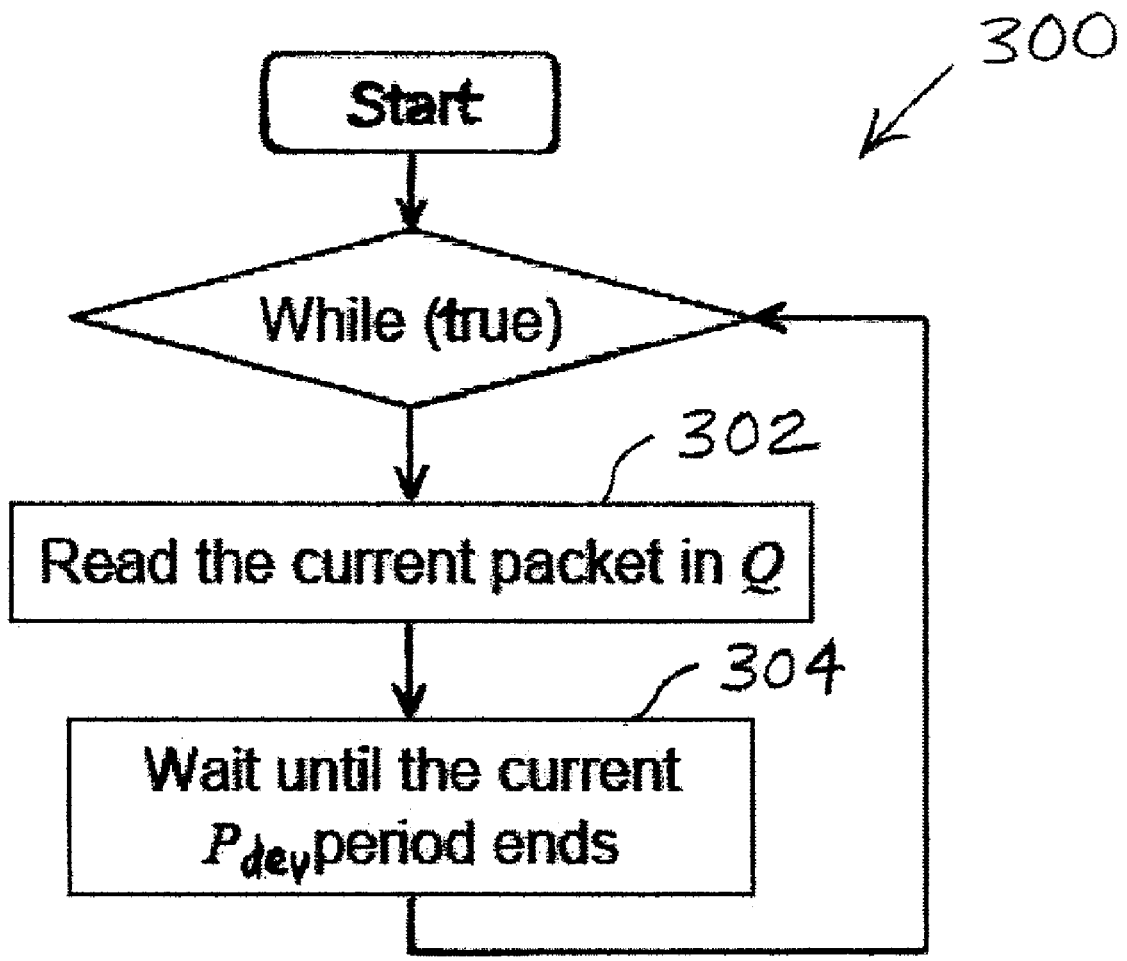
FIG. 3 is a flow chart illustrating one embodiment of an output queue algorithm of the member wireless devices according to the invention.
Figure 4:
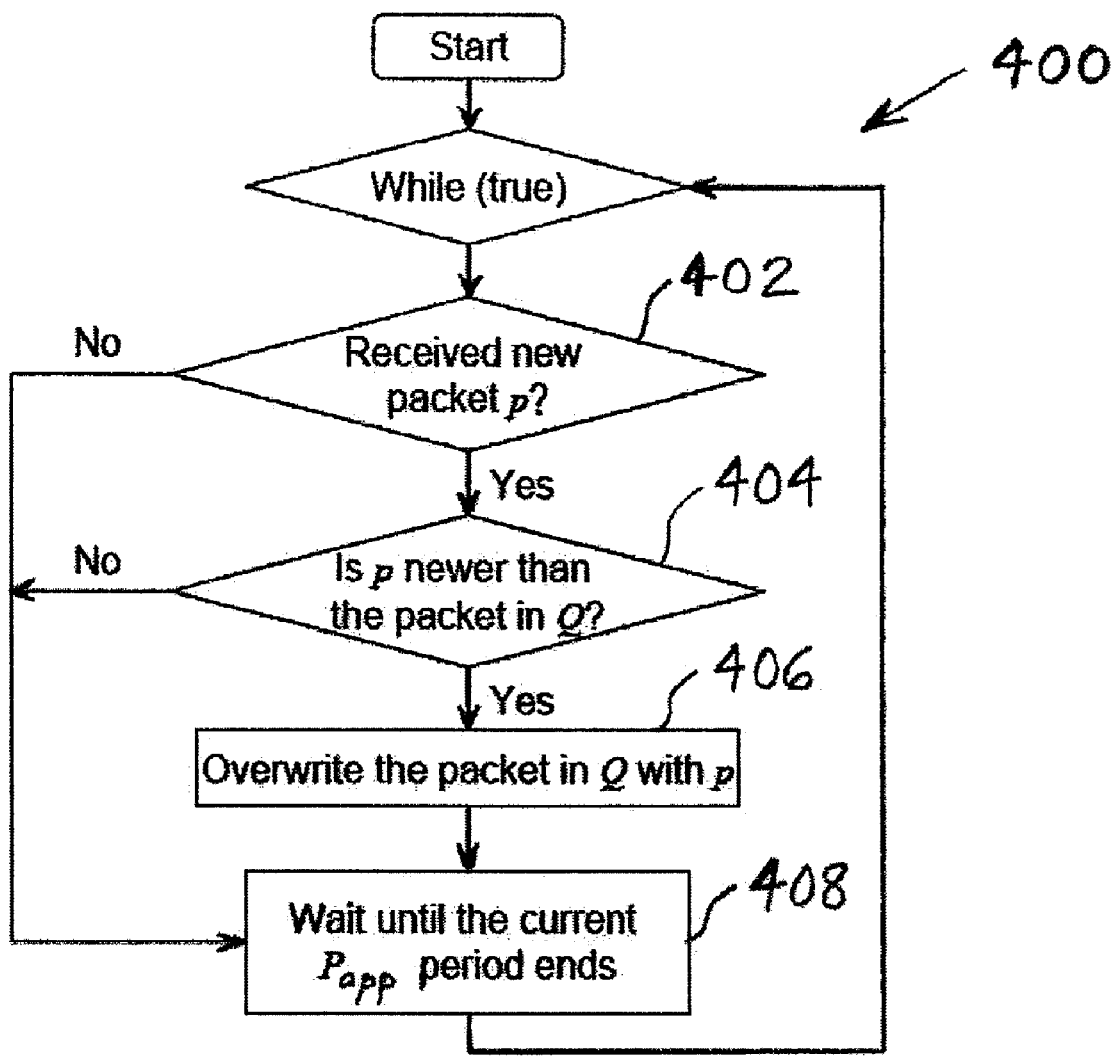
FIG. 4 is a flow chart illustrating one embodiment of an output queue algorithm of the sender end application according to the invention.

FIGS. 3 and 4 show the output queue algorithms 300, 400 of the member wireless devices and sender end application, respectively. In step 302 of the output queue algorithm of the member wireless devices, a member wireless device 26a-n reads the current data packet in queue 24. In a next step 304, the member wireless device waits until its current reading time period $P_{dev}$ ends according to the device's data rate. For example, a 40 kbps ZigBee device may have reading time periods of 25 msec for 1000 bit packets (1000 bits/40 kbps=25 msec), and a 1 Mbps WiFi device may have reading time periods of 1 msec for 1000 bit packets (1000 bits/1 Mbps=1 msec). After its current reading time period ends, the operation of the device returns to step 302 in which the device again reads the current packet in queue 24.

In step 402 of the output queue algorithm of the sender end application, sender end application 22 decides whether a new packet p has been received (or internally created) by the sender end application. If not, sender end application 22 waits until its current writing time period $P_{app}$ ends (step 408) according to the sender end application's data rate. If, on the other hand, a new packet p has been received (or internally created) by the sender end application, then sender end application 22 decides whether the new packet p is newer than the packet that is already in queue 24 (step 404). If not, sender end application 22 waits until its current writing time period $P_{app}$ ends (step 408) according to the sender end application's data rate. If, on the other hand, the new packet p is newer than the packet that is already in queue 24, then sender end application 22 overwrites the packet that is already in queue 24 with the new packet p (step 406). Then, sender end application 22 waits until its current writing time period $P_{app}$ ends (step 408) and operation returns to step 402.

Referring again to FIG. 1, In order to send the received packets to receiver end application 32, member wireless devices 26a-n may put the packets into their respective queues. From the respective individual queues, the packets may be sent to a processor-based global packet scheduling mechanism 34 which may decide an order in which to transmit the packets (or duplicates of the packets) to an input queue 36 shared by all parallel and heterogeneous member wireless devices 26a, 26b, . . . , 26n, of the open architecture.

Figure 5:
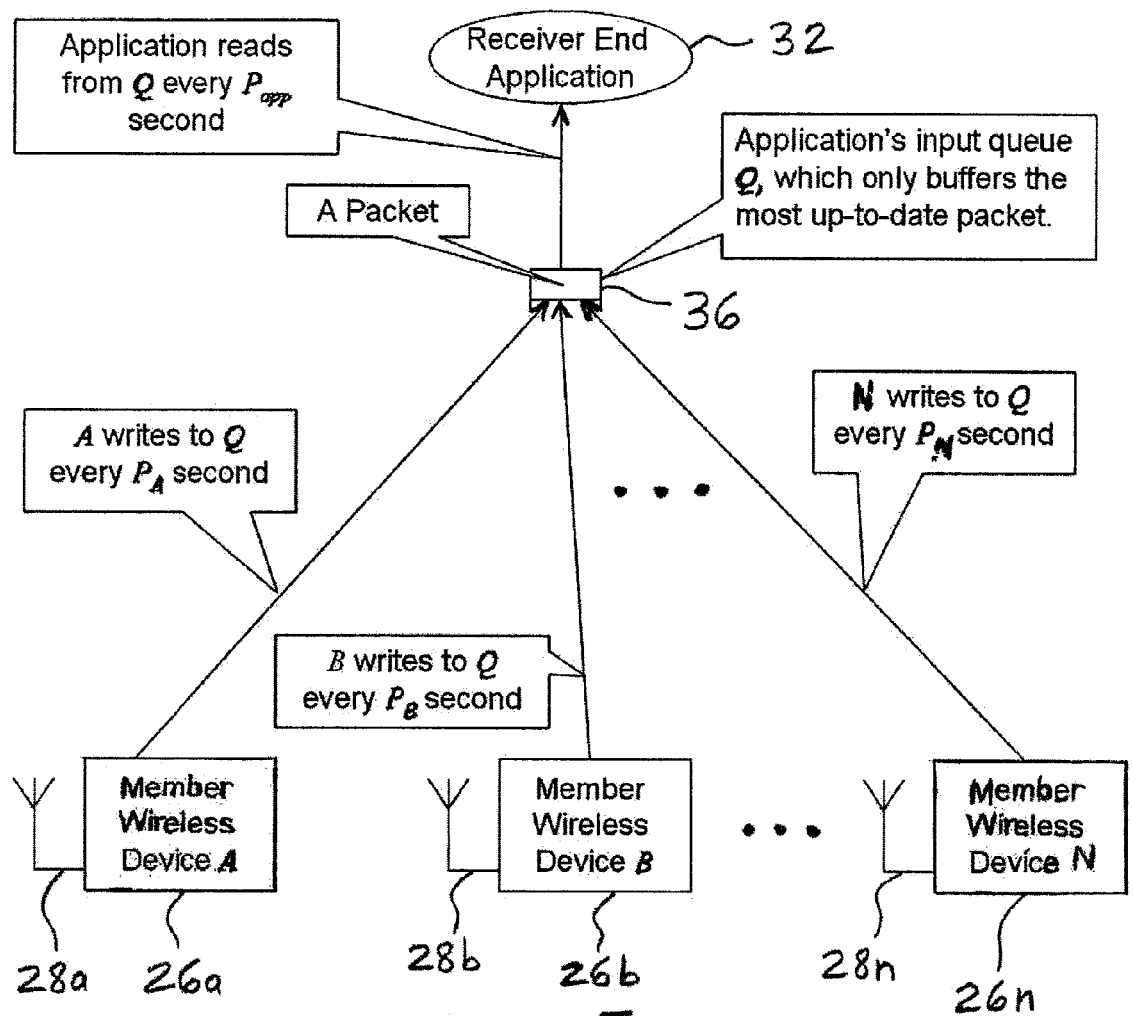
FIG. 5 is a block diagram of another embodiment of a receiver end of a wireless system suitable for use with the wireless communication method of the present invention.

In the embodiment illustrated in FIG. 5, the receiver end application's input queue 36 holds only the most up-to-date packet. Every newly-received packet overwrites the existing packet in the receiver end application's input queue 36. Each member wireless device 26a-n may independently write the receiver end application's input queue 36 according to the device's own data rate.

Figure 6:
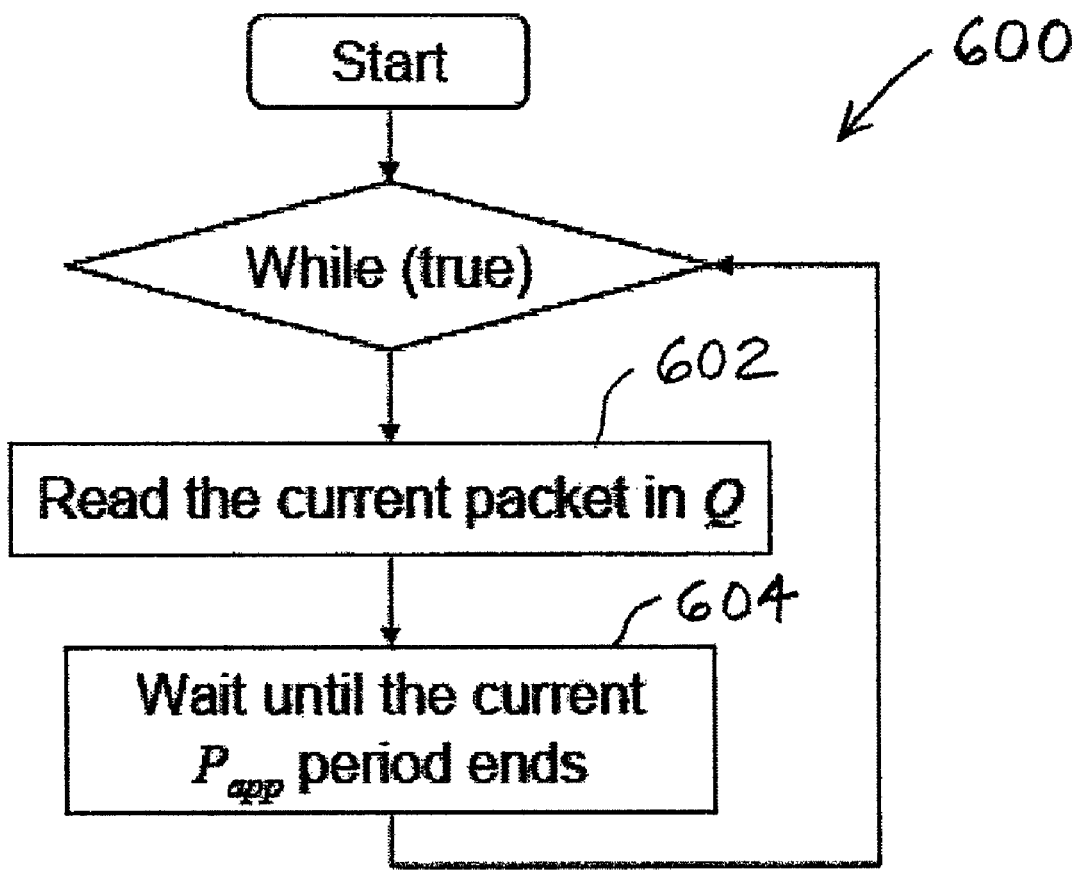
FIG. 6 is a flow chart illustrating one embodiment of an input queue algorithm of the receiver end application according to the invention.
Figure 7:
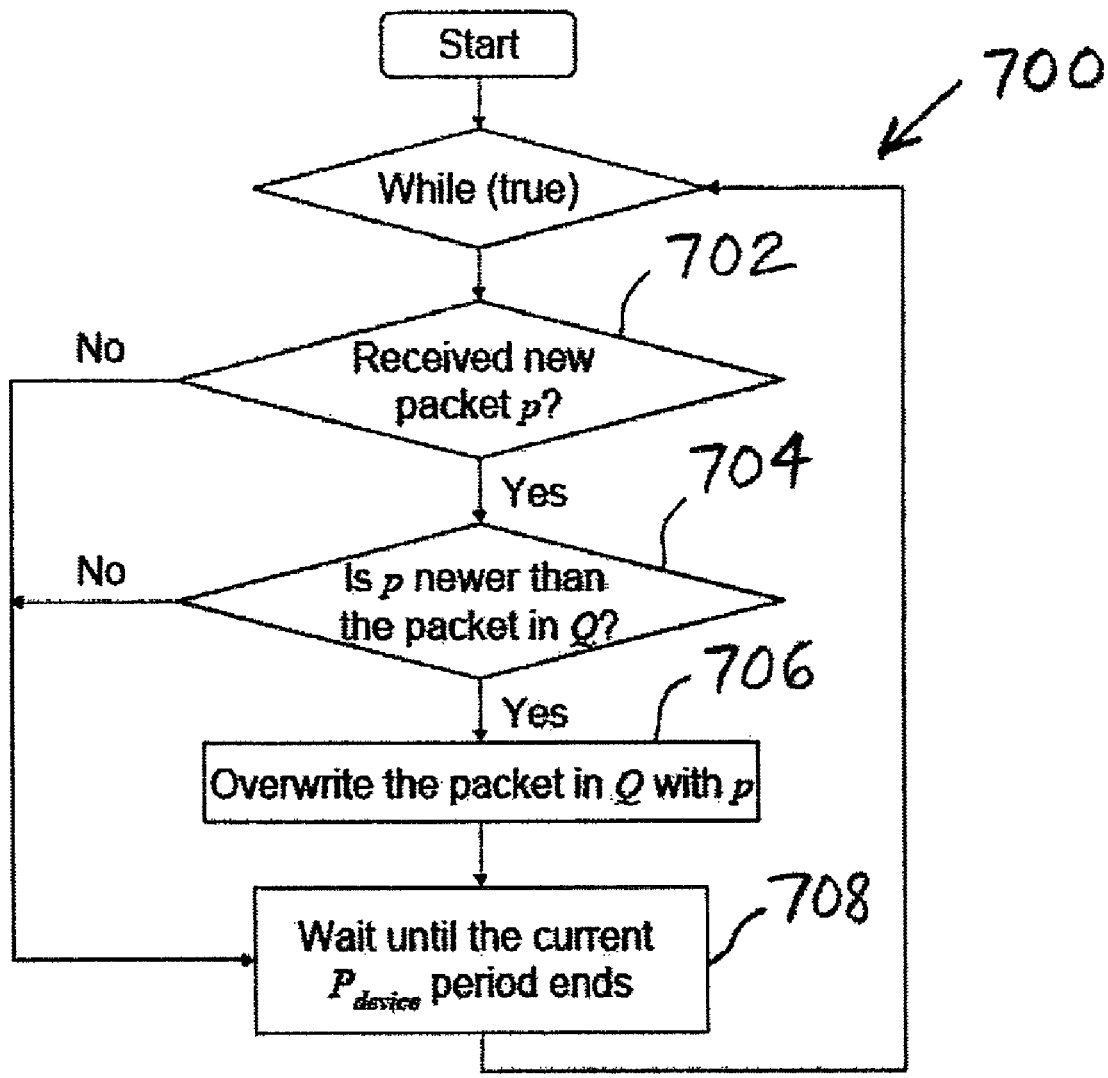
FIG. 7 is a flow chart illustrating one embodiment of an input queue algorithm of the member wireless devices according to the invention.

FIGS. 6 and 7 show the input queue algorithms 600, 700 of the receiver end application and member wireless devices, respectively. In step 602 of the input queue algorithm of the receiver end application, receiver end application 32 reads the current data packet in queue 36. In a next step 604, the receiver end application waits until its current reading time period $P_{app}$ ends according to the receiver end application's data rate. After its current reading time period ends, the operation of the receiver end application returns to step 602 in which the receiver end application again reads the current packet in queue 36.

In step 702 of the input queue algorithm of the member wireless devices, a member wireless device 26a-n decides whether a new packet p has been received from Global Packet Scheduling Mechanism 30. If not, the member wireless device waits until its current writing time period $P_{device}$ ends (step 708) according to the member wireless device's data rate. If, on the other hand, a new packet p has been received from Global Packet Scheduling Mechanism 30, then the member wireless device decides whether the new packet p is newer than the packet that is already in queue 36 (step 704). If not, the member wireless device waits until its current writing time period $P_{device}$ ends (step 708) according to the member wireless device's data rate. If, on the other hand, the new packet p is newer than the packet that is already in queue 36, then the member wireless device overwrites the packet that is already in queue 36 with the new packet p (step 706). Then, the member wireless device waits until its current writing time period $P_{device}$ ends (step 708) and operation returns to step 702.

Using the above scheme, the sender end application, the receiver end application, and the member wireless devices all work independently. All devices send packets for the receiver end application in parallel, and complicated synchronization is avoided.

Figure 8:
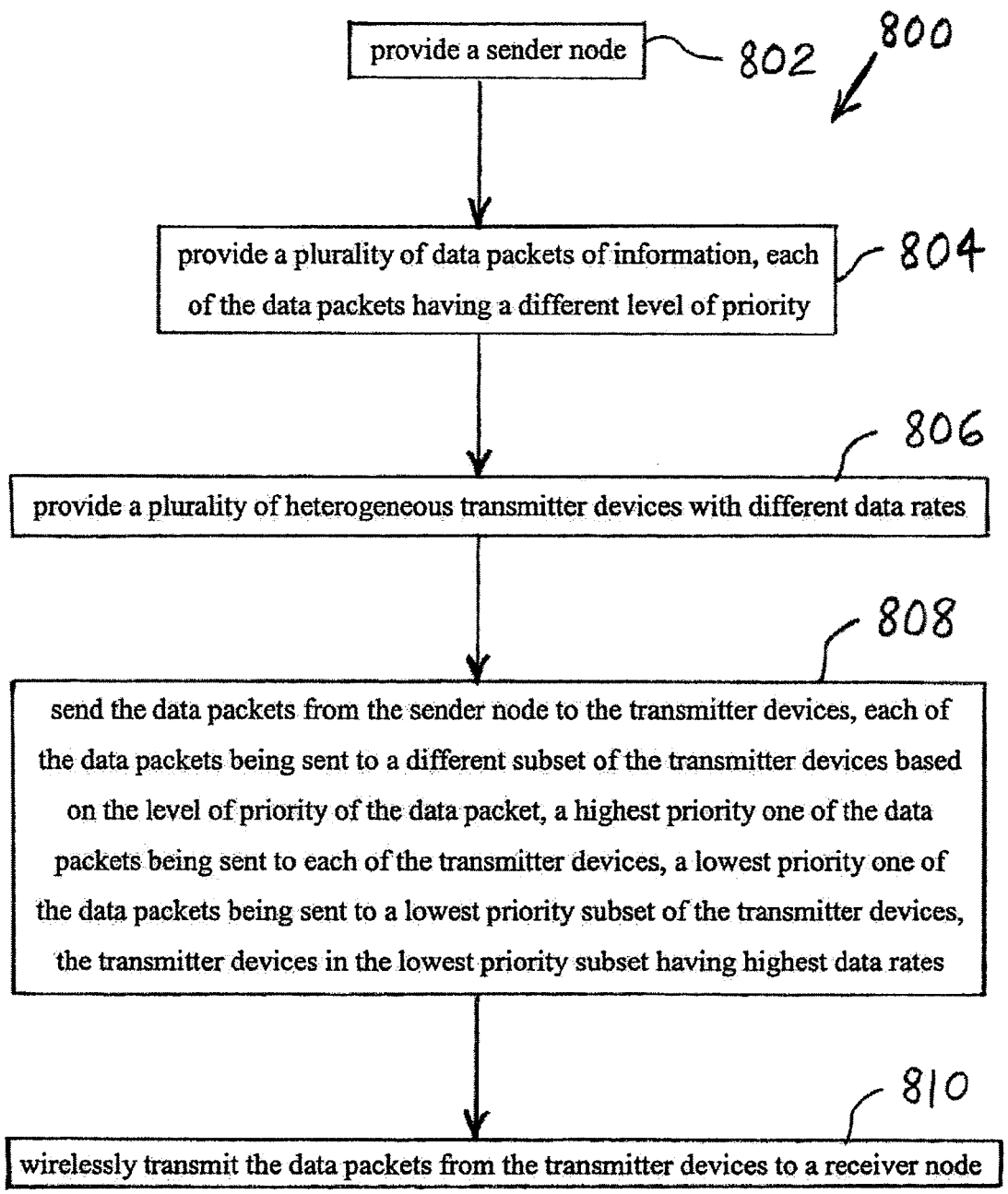
FIG. 8 is a flow chart illustrating one embodiment of a wireless communication method of the present invention.

Illustrated in FIG. 8 is one embodiment of a wireless communication method 800 of the present invention. In a first step 802, a sender node is provided. For example, sender end application 22 may be provided.

In a next step 804, a plurality of data packets of information is provided, each of the data packets having a different level of priority. That is, some of the data packets may be more critical or more important than others of the data packets, and thus may have a higher priority.

Next, in step 806, a plurality of heterogeneous transmitter devices with different data rates is provided. For example, in the embodiment of FIG. 1, member wireless devices 26a-n are provided with different data rates. As a specific example, one of devices 26 may be a ZigBee device having a data rate of 40 kbps, and another one of devices 26 may be a WiFi device having a data rate of at least 1 Mbps.

In step 808, the data packets are sent from the sender node to the transmitter devices. Each of the data packets is sent to a different subset of the transmitter devices based on the level of priority of the data packet. A highest priority one of the data packets is sent to each of the transmitter devices, and a lowest priority one of the data packets is sent to a lowest priority subset of the transmitter devices. The transmitter devices in the lowest priority subset have the highest data rates. That is, data packets may be sent from sender end application 22 to member wireless devices 26a-n. Each of the data packets may be sent to a different subset of member wireless devices 26a-n based on the level of priority of the data packet. A highest priority one of the data packets is sent to each of member wireless devices 26a-n, and a lowest priority one of the data packets is sent to a lowest priority subset of member wireless devices 26*a-n*. Member wireless devices 26*a-n* in the lowest priority subset have the highest data rates. For example, assume that member wireless devices 26*a-n* include a 40 kbps ZigBee card, a 1 Mbps WiFi card, and a 1.2 Mbps Ultra-Wide Band card. A highest priority one of the data packets may be sent to each of the three cards, and a lowest priority one of the data packets is sent to only the 1.2 Mbps Ultra-Wide Band card which has the highest data rate.

In a final step 810, the data packets are wirelessly transmitted from the transmitter devices to a receiver node. That is, member wireless devices 26*a-n* may wirelessly transmit the data packets to receiver end application 32.

The lightweight architecture of the present invention is illustrated herein as being used to transmit data packets from a single sender end application to a single receiver end application. However, it is to be understood that a set of member wireless devices of the present invention can also be easily used to transmit packets from multiple sender end applications to multiple receiver end applications.

While this invention has been described as having an exemplary design, the present invention may be further modified within the spirit and scope of this disclosure. This application is therefore intended to cover any variations, uses, or adaptations of the invention using its general principles.

What is claimed is:

1. A data communication method comprising the steps of:
   providing a sender node having a data packet of information;
   providing a plurality of heterogeneous transmitter devices, each of the transmitter devices having a different data rate;
   sending the data packet to each of the transmitter devices, wherein each of the transmitter devices is configured to read the sent packet at a time interval corresponding to the data rate of the transmitter device; and
   wirelessly transmitting the data packet from each of the transmitter devices to a receiver node; sending the data packet to an output queue; and overwriting an existing data packet in the output queue with the sent data where the transmitter devices receive the most recent packet.

2. The method of claim 1 wherein the data packet is wirelessly sent to each of the transmitter devices.

3. The method of claim 1 wherein the wirelessly transmitting step includes:
   sending the data packet to an input queue; and
   overwriting an existing data packet in the input queue with the sent data packet.

4. The method of claim 1 wherein the data packet is wirelessly transmitted in parallel from each of the transmitter devices to the receiver node.

5. The method of claim 1 wherein the data packet of information comprises a first data packet of information, the method comprising the further steps of:
   providing a plurality of second data packets of information, each of the second data packets having a different level of priority; and
   sending the second data packets from the sender node to the transmitter devices, each of the second data packets being sent to a different subset of the transmitter devices based on the level of priority of the second data packet.

6. A data communication method comprising the steps of:
   providing a sender node;
   providing a plurality of data packets of information, each of the data packets having a different level of priority;
   providing a plurality of heterogeneous transmitter devices;
   sending the data packets from the sender node to the transmitter devices, each of the data packets being sent to a different subset of the transmitter devices based on the level of priority of the data packet; and
   wirelessly transmitting the data packets from the transmitter devices to a receiver node; sending the data packet to an output queue; and overwriting an existing data packet in the output queue with the sent data where the transmitter devices receive the most recent packet.

7. The method of claim 6 wherein each of the transmitter devices has a different data rate.

8. The method of claim 7 wherein each of the transmitter devices is configured to read the sent packets at a time interval corresponding to the data rate of the transmitter device.

9. The method of claim 6 wherein the data packets are wirelessly sent to the transmitter devices.

10. The method of claim 6 wherein the wirelessly transmitting step includes:
    sending the data packets to an input queue; and
    overwriting existing data packets in the input queue with the sent data packets.

11. The method of claim 6 wherein the data packets are wirelessly transmitted in parallel from the transmitter devices to the receiver node.

12. The method of claim 6 wherein a highest priority one of the data packets is sent to each of the transmitter devices, and a lower priority one of the data packets is sent to fewer than each of the transmitter devices.

13. The method of claim 6 wherein a lowest priority one of the data packets is sent to a lowest priority said subset of the transmitter devices, the transmitter devices in the lowest priority subset having highest data rates.

14. A data communication method comprising the steps of:
    providing a sender node;
    providing a plurality of data packets of information, each of the data packets having a different level of priority;
    providing a plurality of heterogeneous transmitter devices with different data rates;
    sending the data packets from the sender node to the transmitter devices, each of the data packets being sent to a different subset of the transmitter devices based on the level of priority of the data packet, a highest priority one of the data packets being sent to each of the transmitter devices, a lowest priority one of the data packets being sent to a lowest priority said subset of the transmitter devices, the transmitter devices in the lowest priority subset having highest data rates; and
    wirelessly transmitting the data packets from the transmitter devices to a receiver node; sending the data packet to an output queue; and overwriting an existing data packet in the output queue with the sent data where the transmitter devices receive the most recent packet.

15. The method of claim 14 wherein the data packets are wirelessly sent to the transmitter devices.

16. The method of claim 14 wherein the wirelessly transmitting step includes:
    sending the data packets to an input queue; and
    overwriting existing data packets in the input queue with the sent data packets.

17. The method of claim 14 wherein each of the transmitter devices has a different data rate, and each of the transmitter devices is configured to read the sent packets at a time interval corresponding to the data rate of the transmitter device.

* * * * *